Figure 1:
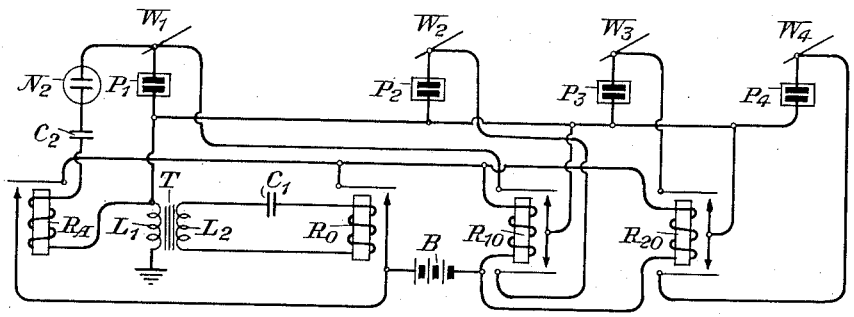

Dec. 29, 1936.    L. K. SWART    2,065,765
ELECTRICAL PROTECTIVE SYSTEM
Filed Oct. 11, 1934    2 Sheets-Sheet 1

INVENTOR
L. K. Swart
BY
ATTORNEY

Dec. 29, 1936.   L. K. SWART   2,065,765
ELECTRICAL PROTECTIVE SYSTEM
Filed Oct. 11, 1934   2 Sheets-Sheet 2

INVENTOR
L. K. Swart
BY
ATTORNEY

Patented Dec. 29, 1936

2,065,765

UNITED STATES PATENT OFFICE 2,065,765

ELECTRICAL PROTECTIVE SYSTEM

Leland Kasson Swart, Mountain Lakes, N. J., assignor to American Telephone and Telegraph Company, a corporation of New York Application October 11, 1934, Serial No. 747,980

14 Claims. (Cl. 179—78)

This invention relates to electrical protective systems. More particularly, this invention relates to arrangements for simultaneously grounding a plurality of circuits when induced voltages above a fixed predetermined value become impressed thereon. Still more particularly, this invention relates to arrangements for testing the apparatus employed in carrying out the principles of this invention.

Pairs of protector blocks, each having an air gap which breaks down at a predetermined potential, have recently been used in the telephone art for the protection of each of a number of telephone circuits from high voltages set up therein by one or more sources extraneous to the circuits themselves. In these arrangements a resistor or saturating reactor is interposed in the ground connection of each pair of protector blocks or in the common ground connection of all the protector blocks. This resistor or reactor, as the case may be, is designed to carry all of the operating current flowing through all of the protector blocks associated therewith.

In some of these arrangements the impedance drop across the resistor or reactor is rectified by a rectifier which may be, for example, of the copper oxide type. The rectified current is applied to the winding of a relay which, when operated, shunts a pair of the protector blocks. The rectified current is also supplied to a pilot relay which applies local battery to all the short-circuiting relays which are associated with the apparatus for the purpose of grounding all of the protector blocks against the currents which traverse these blocks during the period in which extraneous voltages are applied to one or more of the lines.

In another protective arrangement the current traversing one or all of the protector blocks at a particular point along one or more exposed lines is applied to a saturating reactor or transformer. This current in turn is caused to operate an alternating current relay the contacts of which apply local battery to a plurality of short-circuiting relays which are associated with the apparatus. These short-circuiting relays operate to short-circuit all of the protector blocks and thereby prevent these protector blocks from becoming permanently grounded.

The carbon protector block alone does not always operate within a narrow range of voltage. Accordingly, it is proposed that a gas discharge tube device be shunted around a protector block so that a fixed operating voltage depending upon the design and character of the gas discharge tube may be obtained. The shunt circuit around the protector block may include either the gas discharge tube device itself or a series circuit including in addition to that device a condenser, a relay, etc., as will be described more clearly hereinafter. With apparatus of the type just referred to the operating voltage may be made to lie above the normal telegraph and ringing voltages applied to the line or lines and below the minimum operating voltage of the carbon protector. Furthermore, the use of a gas discharge tube device, together with a condenser and relay, is practicable for operation of the protective apparatus from a voltage applied to the line from a remote point. The latter feature is particularly valuable for testing the apparatus connected with the line or lines from the remote point. In accordance with this invention a particular protective arrangement connected or coupled to the line may be selected, and a voltage or voltages of predetermined magnitude or magnitudes may be applied to the line to determine from a remote point the actual voltage at which a break-down may occur.

If a condenser is used in series with a gas discharge tube arrangement such as just referred to, an alternating current potential may be applied to the line from a remote point for testing the apparatus, and the magnitude of this alternating potential may, of course, be below that of the break-down voltage of the protector blocks associated with the line. This potential will produce a glow within the gas discharge tube and current will therefore be passed through the tube as well as through the associated relay. The operation of this relay may be employed to apply local battery to one or more short-circuiting relays in order that the line or lines with which the short-circuiting relays are associated may become temporarily grounded. While the line is thus momentarily grounded or short-circuited, a low potential may be applied, for example, to four of the conductors in parallel for the purpose of supplying sufficient current to hold the relay protective device operated. This may be accomplished by passing current along these parallel conductors and through the contacts of the short-circuiting relay or relays and thence through the resistor or reactor or transformer to ground, thereby causing the equipment to hold up in the required manner.

Figure 2:
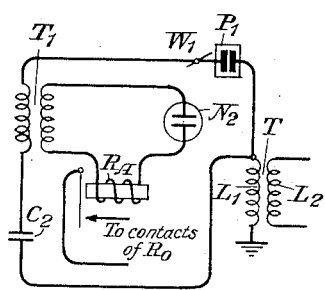
Figure 3:
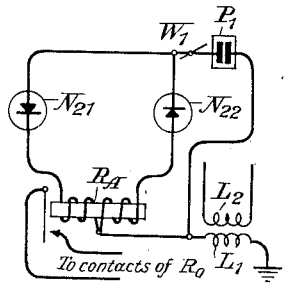
Figure 4:
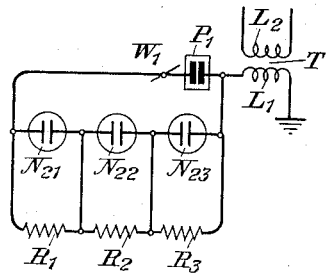
Figure 5:
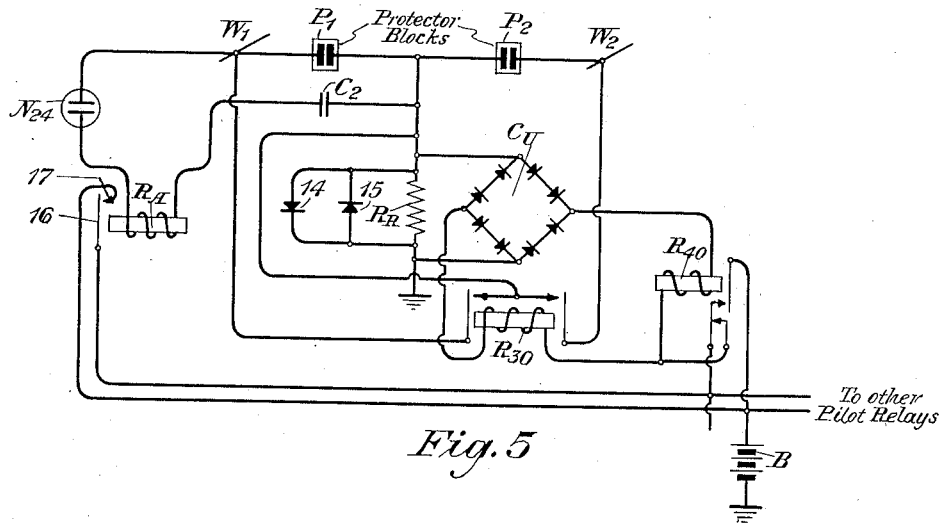

This invention will be better understood from the detailed description hereinafter following when read in connection with the accompanying drawings, in which Figure 1 shows a preferred embodiment of this invention in which a gas discharge tube is included in a circuit in shunt with a protector block; Fig. 2 shows the gas discharge tube coupled to the circuit of the protector block through a transformer; Fig. 3 shows a protector shunted by two devices which may be gas discharge tubes acting as rectifiers and poled in mutual opposition; Fig. 4 shows a plurality of series-connected gas discharge tubes in a circuit in shunt with the protector block; Fig. 5 shows a more detailed arrangement including in addition to the gas discharge tube a form of rectifier; and Figs. 6, 7, 8 and 9 disclose other arrangements including various gas discharge tube devices in association with one or more exposed lines and in shunt with a protector block.

Referring to Fig. 1 of the drawings, the reference characters $W_1$, $W_2$, $W_3$ and $W_4$ represent four of a plurality of conductors or circuits or lines which may be supported, for example, by a common protector pole, and each of these conductors may be connected to ground through an individual pair of protector blocks and a common reactor designated $L_1$. The protector blocks associated with the various lines are designated $P_1$, $P_2$, $P_3$ and $P_4$, respectively. Reactor $L_1$ is shown as a winding having a saturating core, preferably of iron or an alloy thereof, and this reactor may form one of the elements of a transformer T, as shown. The lower terminal of each of the protector blocks is connected to the upper terminal of the reactor $L_1$, while the upper terminal of each block is connected to one of the conductors $W_1$ to $W_4$. As is well known, each of the various protector blocks may include two carbon electrodes spaced from each other by a gap of predetermined width which, for example, may be .003 inch.

The secondary winding $L_2$ of the transformer T is connected to the winding of an alternating current relay $R_0$, the connection including a series condenser $C_1$. The condenser $C_1$ is not a necessary element of the arrangement but is merely optional. If it is used it may act to tune the circuit in series with the winding of the relay $R_0$ to some definite frequency, for example, 25 or 60 cycles, which may be the frequency of current transmitted over nearby power circuits. By so tuning the circuit the time and energy required to operate the relay $R_0$ may be reduced to a minimum. It will be evident, also, that the condenser $C_1$ is employed to tune the circuit to that frequency which is most apt to be impressed upon the exposed line or lines and which may be most hazardous to the people working on or near the line or lines.

The relays designated $R_{10}$ and $R_{20}$ may be termed short-circuiting relays and they are associated with the protector blocks $P_1$ to $P_4$, inclusive. The windings of these relays are connected in parallel relationship, the parallel circuit being arranged in series with a battery B or other source of current and the armature and contact of the relay $R_0$.

When the relay $R_0$ becomes operated current will flow from the battery B through the armature and contact of the relay $R_0$ and through the windings of the short-circuiting relays $R_{10}$ and $R_{20}$. The armatures of the latter relays will become attracted and their associated contacts, which are preferably of the heavy duty type, will provide paths in shunt with the protector blocks $P_1$ to $P_4$, inclusive. It will be apparent that the upper armature and contact of the relay $R_{10}$ will shunt the protector block $P_1$, that the lower armature and contact of the same relay will shunt the protector block $P_2$ and that the upper and lower armatures and their respective contacts of the relay $R_{20}$ will shunt the protector blocks $P_3$ and $P_4$. Thus, the operation of the relays $R_{10}$ and $R_{20}$ will simultaneously shunt all of the protector blocks $P_1$ to $P_4$, and by so shunting these blocks the various conductors $W_1$ to $W_4$, inclusive, will be simultaneously grounded through the reactor $L_1$.

In addition to the equipment already described in connection with Fig. 1, a conductor or line which traverses the entire range of the exposure and which is preferably grounded at the far end through some equipment such as a composite telegraph set, etc., may be chosen to act as a pilot conductor. At a particular point along the length of this pilot conductor, which may be the conductor $W_1$ for the purpose of illustration, a gas discharge tube $N_2$ may be connected in series with a condenser $C_2$ and the winding of an alternating current relay $R_A$, the connection terminating at the high potential terminal of the reactor $L_1$. The armature and contact of the relay $R_A$ may be connected in multiple with the armature and contact of the relay $R_0$, as shown. The armature and contact of the relay $R_A$ will, therefore, perform the same function as that performed by the armature and contact of the relay $R_0$.

The condenser $C_2$ is not an indispensable element of this combination. It need be employed only if the service over the pilot conductor $W_1$ involves the use of direct current with an associated path to ground. In this arrangement the condenser serves to prevent the operation of the protective apparatus from the voltages employed in the direct current service over that conductor.

The manner in which the apparatus of Fig. 1 operates is as follows. Extraneous voltages may become induced in the various conductors $W_1$, $W_2$, $W_3$ and $W_4$. Taking the conductor $W_1$ as an illustration and assuming that the voltage required to break down the space between the electrodes of the gas tube $N_2$ is somewhat less than that required to break down the gap of the protector block $P_1$, but greater than that required to cause the glow discharge between the electrodes of the gas tube $N_2$, a discharge of substantial current will flow from the conductor $W_1$ through the electrodes of the gas tube $N_2$, the condenser $C_2$, the winding of the relay $R_A$, the reactor $L_1$ of transformer T and ground. The relay $R_A$ will become operated and the closure of its armature and contact will cause a flow of current from the battery B through the parallel windings of the relays $R_{10}$ and $R_{20}$. The armatures of these relays $R_{10}$ and $R_{20}$ will be simultaneously attracted, and therefore the conductors $W_1$ to $W_4$ will be connected to ground through the armatures and contacts of these relays and through the reactor $L_1$, as already described. This will allow more of the extraneous currents impressed upon the conductors $W_1$, $W_2$ and $W_3$ and $W_4$ to be passed through the reactor $L_1$. It will be apparent that if the extraneous voltages persist, the current through the reactor $L_1$ will be greater than that which formerly traversed it when the gas tube $N_2$ alone provided the current which was transmitted through it. The increased current through the reactor $L_1$ will be sufficient to bring about the operation of the relay $R_0$, and the relay $R_0$ will remain operated as long as the current through the reactor $L_1$ is sufficient for that purpose. As long as relay $R_0$ remains operated all of the lines $W_1$ to $W_4$ will be shunted to ground through the reactor $L_1$.

The upper armature and contact of the relay $R_{10}$, which short-circuits the protector block $P_1$, also short-circuits the circuit which includes the gas tube $N_2$, the condenser $C_2$ and the winding of the relay $R_A$. The gas tube $N_2$ therefore remains operated only for a very brief interval of time, for example, a few thousandths of a second, which is the time required for the operation of the relay $R_A$ and the relays $R_{10}$ and $R_{20}$. It will be understood also that if the gas tube $N_2$ is of sufficiently low impedance and is moreover capable of carrying sufficient current, it may, by discharge between its electrodes, furnish sufficient current through the reactor $L_1$ of transformer T to operate the relay $R_0$.

If it is desired to test the protective equipment shown in Fig. 1 from some remote point, an alternating current potential of a value below that required to break down the protector block $P_1$ but in excess of that required to break down the space between the electrodes of the gas tube $N_2$ and to overcome the impedance drop of the condenser $C_2$ and winding of the relay $R_A$, may be applied between the conductor $W_1$ and ground at the remote testing point. This potential will immediately cause the operation of the relay $R_A$. The closure of the contact of the relay $R_A$ will permit current from battery B to flow through the parallel windings of relays $R_{10}$ and $R_{20}$ to operate these relays, and the contacts of these relays will short-circuit the protector blocks $P_1$ to $P_4$. At the same time the circuit of the gas tube $N_2$ the condenser $C_2$ and the winding of the relay $R_A$ will be shunted by the upper armature and contact of the relay $R_{10}$, and therefore the impedance between the various conductors $W_1$ to $W_4$ and ground will be relatively low. The application of a potential of but a few volts between any one or all of the conductors $W_1$ to $W_4$ and ground will cause sufficient current to flow through the reactor $L_1$ of transformer T to operate the relay $R_0$, and the latter relay will remain operated until the aforementioned low voltage has been withdrawn from these conductors.

In Fig. 2 the protector block $P_1$ is also connected between the conductor $W_1$ and the high potential side of the reactor $L_1$ of the transformer T. In shunt with the protector block $P_1$ there is a circuit which includes the primary winding of a transformer $T_1$ and a condenser $C_2$. The secondary winding of this transformer is connected in series with the gas tube $N_2$ and the winding of the relay $R_A$. As the voltage across the primary winding of the transformer $T_1$ builds up to a value sufficient to impress a voltage across the electrodes of the gas tube $N_2$ sufficient to break down the space therebetween, the relay $R_A$ will become operated. The closure of the contact of the relay $R_A$ may be employed, as in the arrangement of Fig. 1, to cause current to flow from a battery such as B, through the windings of short-circuiting relay such as $R_{10}$ and $R_{20}$, and the contacts of the latter relays may be employed to shunt protector blocks associated with other conductors (not shown in Fig. 2 but shown in Fig. 1). It will be apparent also that the secondary winding of the transformer $T_1$ may be connected to a relay winding such as $R_0$, shown in Fig. 1, the armature and contact of which will multiple the armature and contact of the relay $R_A$.

In Fig. 3 a protector block $P_1$ is associated with the conductor $W_1$, but the circuit in shunt with the protector block $P_1$ includes a pair of gas discharge tubes $N_{21}$ and $N_{22}$. These gas discharge tubes may be of the rectifier type. They may be poled in mutual opposition, as shown, and they may be connected in parallel circuits in series with the two windings of the relay $R_A$, as shown. The midpoint or terminal common to the windings of the relay $R_A$ may be connected to the high potential side of the reactor $L_1$ of the transformer T.

If there is impressed between the conductor $W_1$ and ground a voltage which is positive to the conductor and negative to ground and of sufficient magnitude, a current will pass from the conductor $W_1$, through the gas tube $N_{21}$ and through the left hand winding of the relay $R_A$, through the reactor $L_1$ and to ground. This current will be sufficient to operate the relay $R_A$ even though no current flows through its other winding, since no current is allowed to flow therethrough by virtue of the poling of the gas tube rectifier $N_{22}$. On the other hand, if a sufficient voltage is impressed between the conductor $L_1$ and ground which is positive to ground and negative to the conductor $W_1$, a current will pass through the winding $L_1$ of transformer T, right-hand winding of the relay $R_A$ and through the gas tube $N_{22}$ and conductor $W_1$. The current through the latter winding will operate the relay $R_A$ even though no current flows through the left-hand winding of that relay because of the poling of the gas tube rectifier $N_{21}$. Thus the relay $R_A$ will be operated by voltage produced by either half cycle of an alternating current voltage which may be applied between the conductor $W_1$ and ground. Moreover, the relay $R_A$ may be operated by a direct potential of either polarity.

It will be understood that in the arrangement of Fig. 3 the devices $N_{21}$ and $N_{22}$ need not be of the gas tube type but may, if desired, be any form of rectifier well known in the art. It will be further understood that the secondary winding $L_2$ of the transformer T may be connected to the winding of a relay such as $R_0$, shown in Fig. 1, and that such an arrangement may be implied in the description of the other arrangements shown in the drawings of this case. It will be further understood that the armature and contact of the relay $R_A$ may be multipled to the armature and contact of the relay $R_0$, as shown in Fig. 1, and that this also may be considered as implied in the description of the other arrangements shown in the drawings of this case.

Fig. 4 shows an arrangement in which a plurality of gas discharge tubes $N_{21}$, $N_{22}$ and $N_{23}$ are connected in series relationship in a circuit which shunts the protector block $P_1$. These shunt circuits are interposed between the conductor $L_1$ and the high potential side of the winding or reactor $L_1$ of the transformer T. The tubes $N_{21}$, $N_{22}$ and $N_{23}$ may, of course, be cold cathode gas filled tubes of any well known type.

The tubes $N_{21}$, $N_{22}$ and $N_{23}$ are shunted by large resistances $R_1$, $R_2$ and $R_3$ respectively. The employment of a multiplicity of series-connected gas filled tubes is particularly advantageous where it is desired to obtain operation at a volt well above the break-down voltage of a single tube alone. As a general rule the break-down voltage of three series-connected tubes would be approximately equal to three times the break-down voltage of a single one of these tubes, if the break-down voltages of the various tubes are alike.

However, if gas tubes are connected in series as shown in Fig. 4, it is necessary to shunt these tubes by the resistances $R_1$, $R_2$ and $R_3$, as shown, in order that the voltage applied across one of the tubes may be substantially equal to that applied across the other of the tubes. If the resistances $R_1$, $R_2$ and $R_3$ were not employed, however, a particular gas tube of high leakage between electrodes would cause a voltage increase across the tube or tubes of lesser leakage, and the tube or tubes of lesser leakage would break down sooner than the tube or tubes of higher leakage. In fact, if the resistances $R_1$, $R_2$ and $R_3$ were not employed, it would be virtually impossible to arrange that the break-down voltage of the series tubes would be equal to the sum of the break-down voltages of the individual tubes.

It will be apparent, as before, that the winding $L_2$ of the transformer T may be connected to circuits similar to those shown in Fig. 1, and this will be understood in the description of the other arrangements hereinafter described. It will be further understood that while a relay such as $R_A$ is not shown in Fig. 4, such a relay may be included if desired, and its winding may be located between the high potential side of the winding $L_1$ and the right-hand terminal of the gas discharge tube $N_{23}$, and that the contacts of this relay may be arranged in circuits similar to those shown hereinabove and described in connection with Fig. 1.

In Fig. 5 no saturating reactor or transformer and no relay such as the one designated $R_0$ are employed, but these are replaced by a resistor $R_R$, a copper oxide rectifier arrangement $C_U$, copper oxide shunting devices 14 and 15 which are arranged in mutual opposition, a short-circuiting relay $R_{30}$ and a pilot relay $R_{10}$. This type of protective arrangement is understood in the art and its operation need not be further described. The apparatus of Fig. 5, however includes a gas discharge tube $N_{24}$, a relay $R_A$ and a condenser $C_2$ which are connected in a circuit in shunt with the protector block $P_1$. The latter shunt circuit is arranged so that upon a discharge of current through the gas discharge tube $N_{24}$ the relay $R_A$ will operate and in turn bring about the operation of the short-circuiting relay $R_{30}$, the contacts of which are employed to shunt the protector blocks $P_1$ and $P_2$ out of the circuit.

If the gas discharge tube $N_{24}$ is designed to operate at a lower voltage than the protector block $P_1$, then upon the application of such a voltage current may flow from the conductor $W_1$ through the gas tube $N_{24}$, through the winding of the relay $R_A$ and the condenser $C_2$ to the high potential side of the resistor $R_R$, and thence through that resistor to ground. The armature 16 of the relay $R_A$ will close its contact 17. This will cause current to flow from the battery B over the circuit which includes the armature 16 and the contact 17 of the relay $R_A$, the normal release contacts of relay $R_{10}$, the winding of relay $R_{30}$ and one arm of the copper oxide rectifier arrangement $C_U$ to ground. Upon the operation of the relay $R_{30}$ and the operation of similar relays the windings of which may be connected in shunt with the winding of relay $R_{30}$, all of the conductors such as $W_1$ and $W_2$ will be connected to ground through the resistor $R_R$.

It will be apparent from the description that the gas tube arrangements shown in Figs. 2, 3 and 4 may replace the gas tube shunt circuit shown in Fig. 5, and that in each case the gas tube arrangement will be connected in shunt with one of the protector blocks such as $P_1$, all of which is within the scope of this invention.

Figure 6:
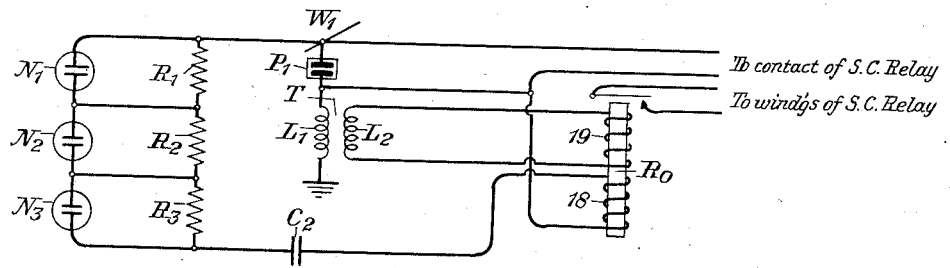

Fig. 6 shows an arrangement which is suitable for testing the circuit at a fixed voltage from a remote point. Here the conductor $W_1$ acts as a pilot conductor, and each pair of conductors has a short-circuit relay (not shown) associated therewith and a protector block such as $P_1$. The protector block $P_1$ is shunted by a group of gas tubes $N_1$, $N_2$ and $N_3$ which are connected in series relationship, and these gas tubes are shunted by large resistances $R_1$, $R_2$ and $R_3$, respectively. The series arrangement of gas tubes is also connected in series with the condenser $C_2$ and the winding 18 of the relay $R_0$. The other side of the winding 18 is connected to the high potential side of the reactor $L_1$ of the transformer T which extends to ground.

When current passes through the series gas discharge tubes $N_1$, $N_2$ and $N_3$ through the condenser $C_2$ and the winding 18 of the relay $R_0$, the relay $R_0$ will become operated. This will bring about the closure of the contact of the relay $R_0$ and will therefore complete a circuit extending to the parallel connected windings of short-circuiting relays via some source of current, such as a battery, and the operation of the latter relays will act to short-circuit the various protector blocks, only one of which is shown in this figure and is designated $P_1$.

It is to be noted that the secondary winding $L_2$ of the transformer T is directly connected to the winding 19 of the relay $R_0$. A sufficient current impressed upon the winding 19 by the transformer T will also operate the relay $R_0$ and at the same time bring about the short-circuiting of the various protector blocks. It will be evident also that the contacts which are employed to shunt the protector blocks $P_1$ and other similar blocks (not shown) likewise shunt the circuit which includes the three gas discharge tubes $N_1$, $N_2$ and $N_3$. It will be further apparent that when current is transmitted over the various discharge tubes $N_1$, $N_2$ and $N_3$ through the circuit which includes the winding 18 of the relay $R_0$, current will also be transmitted through the reactor $L_1$ or primary winding of the transformer T, and this additional current will aid in maintaining the relay $R_0$ continuously operated throughout the duration of the application of the extraneous voltage upon the conductor at $W_1$.

Figure 7:
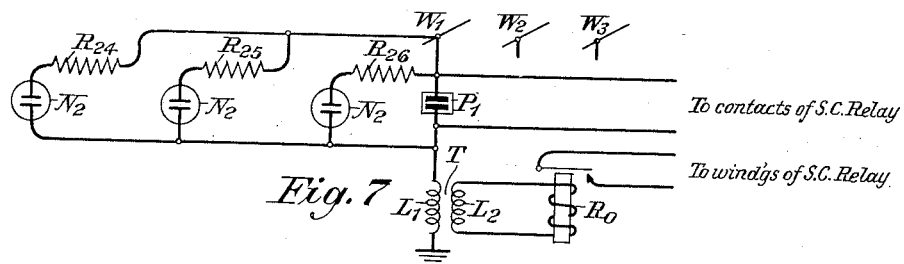

In Fig. 7 the protector block $P_1$ is shunted by a plurality of gas filled tubes designated $N_2$. These gas filled tubes are connected in series with individual resistances $R_{21}$, $R_{22}$ and $R_{23}$. If the voltage impressed between the conductor $W_1$ and ground is of sufficient magnitude to break down the gas discharge tubes $N_2$ but of insufficient magnitude to break down the protector block $P_1$, the operation of the tubes $N_2$ will allow sufficient current to pass through the primary winding $L_1$ of the transformer T, and this in turn will bring about the operation of the relay $R_0$. Relay $R_0$ will apply sufficient voltage to the windings of a number of short circuiting relays, which in turn will close the appropriate contacts for shunting the protector block $P_1$ and additional blocks connected to other conductors similar to $W_1$ but not shown. At the same time the circuits of the various gas discharge tubes $N_2$ and their associated resistances $R_{24}$, $R_{25}$ and $R_{26}$ will be shunted out of the circuit.

It will be apparent that the conductor $W_1$ of Fig. 7 is employed to act as a pilot, and that the gas discharge tubes $N_2$ are connected at a single protector point along this pilot conductor. At another point along a different conductor, such as $W_2$, similar protector apparatus may be associated. At a third point along still another conductor $W_3$ similar apparatus may be associated. A voltage sufficient to break down the various gas discharge tubes may be transmitted along each of the various conductors at a different time for selectively testing the apparatus connected to these various conductors from a remote point.

Figure 8:
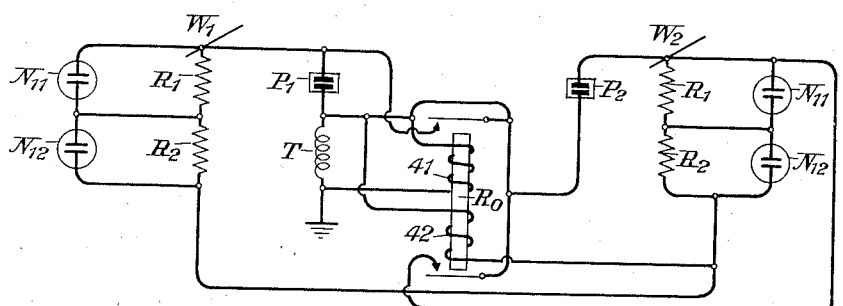

The relay $R_0$ of Fig. 8 has two windings, 41 and 42. The winding 41 is connected to the reactor T. The winding 42 is connected in series with two groups of gas discharge tubes, as shown, each group including tubes $N_{11}$ and $N_{12}$. One of these groups of tubes is connected with the conductor $W_1$ while the other group is connected with the conductor $W_2$. The lower terminal of both groups of tubes is connected through the winding 42 of the relay $R_0$ to the high potential side of the reactor T.

When a potential exceeding a predetermined value is impressed between either conductor $W_1$ or $W_2$ and ground and is sufficient to ionize the gas within the tubes $N_1$ and $N_2$ of either group, current will be passed through the winding 42 of the relay $R_0$ and through the reactor T to ground. This current will operate the relay $R_0$ and its contacts will short-circuit the protector blocks $P_1$ and $P_2$ as well as the groups of tubes $N_{11}$ and $N_{12}$ associated with these protector blocks. The operation of the relay $R_0$ reduces the impedance between the conductors $W_1$ and $W_2$ on the high potential side of the reactor T to a negligible value and this, in effect, tends to increase the current through the reactor T. The increased potential set up across the reactor T will hold the armatures of the relay $R_0$ closed throughout the duration of the extraneous potential. The relay $R_0$ will release upon the removal or disappearance of the induced extraneous potential on the conductors $W_1$ and $W_2$.

It will be noted that resistances $R_1$ and $R_2$ are connected in shunt with the discharge devices $N_{11}$ and $N_{12}$ respectively. These resistances are employed for the purpose of maintaining the discharge characteristics of both devices substantially the same.

Figure 9:
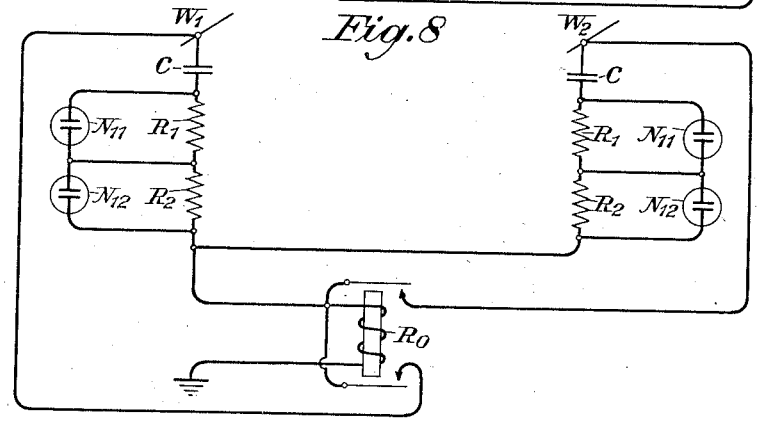

In Fig. 9 there is shown an arrangement which does not require any protector blocks. The conductors $W_1$ and $W_2$ are protected by the armatures and contacts of the short-circuiting relay $R_0$.

Both of the conductors $W_1$ and $W_2$ are connected to the high potential side of the winding of the relay $R_0$ through condenser C in series with the gas discharge devices $N_{11}$ and $N_{12}$, the latter being shunted respectively by resistors $R_1$ and $R_2$. The low potential side of the relay winding is connected to ground. It will be apparent that the condenser C may be eliminated if direct current potentials are not normally impressed upon the conductors $W_1$ and $W_2$.

If the potential impressed between the conductor $W_1$ and ground is sufficient to overcome the impedance of the relay winding and the condenser C after ionizing the gas filled tubes $N_{11}$ and $N_{12}$, a substantial current will flow through the tubes $N_{11}$ and $N_{12}$ and through the winding of the relay $R_0$ and the condenser C. The relay $R_0$ will then operate and its armatures will close their associated contacts. The lower armature of relay $R_0$ and its contact will connect the conductor $W_1$ to ground through the winding of the relay $R_0$. The upper armature of the relay $R_0$ and its contact will connect the conductor $W_2$ to ground through the winding of the relay $R_0$. When the potential impressed between the conductors $W_1$ and $W_2$ and ground is reduced below the value just referred to, the relay $R_0$ will release and the gas within the devices $N_{11}$ and $N_{12}$ will no longer remain ionized.

It will be apparent that each armature of the relay $R_0$ and its contact when closed will shunt one of the groups of gas discharge devices $N_{11}$ and $N_{12}$. Consequently these devices will be effectively removed from the circuit immediately after the relay $R_0$ is operated and will remain effectively removed from the circuit until the voltage across the winding of the relay $R_0$ is insufficient to maintain that relay operated.

It will be apparent that the resistors $R_1$ and $R_2$ which shunt the devices $N_{11}$ and $N_{12}$ may be entirely dispensed with if a sufficient breakdown potential may be obtained from a single gas discharge device. These resistances $R_1$ and $R_2$ are employed only when two or more tubes are connected in series relationship. It will be also understood that the number of conductors such as $W_1$ and $W_2$ is not limited to two, as illustrated, but any additional number of such conductors may be similarly connected to the contacts of the relay $R_0$ through appropriate gas discharge devices, and that the relay $R_0$ may have a plurality of armatures with corresponding contacts to short-circuit all of the various gas discharge devices after the short interval of time necessary to operate the relay $R_0$ has elapsed. This is all within the scope of this invention. It will be desirable, if a great many circuits are connected with a single relay winding, that the core of the relay be of the saturating type and sufficiently sensitive to operate upon the application of the discharge current obtained from a single conductor and yet be able to carry the heavy currents derived from a large number of conductors. This is also within the scope of this invention.

While this invention has been shown and described in certain particular arrangements merely for the purpose of illustration, it will be understood that the general principles of this invention may be applied to other and widely varied organizations without departing from the spirit of the invention and the scope of the appended claims.

What is claimed is:

1. Protective apparatus for a current-carrying conductor exposed to inductive interference comprising a protector block, a reactor connected between ground and the current-carrying conductor through said protector block, and a gas filled tube bridged across said protector block by conductors which remain permanently closed.

2. Protective apparatus for a telephone line exposed to inductive interference comprising a protector block, a reactor connected between ground and said line through said protector block, a gas filled tube, and means comprising a closed wire circuit interconnecting said gas filled tube and said protector block so that the tube will effectively shunt the protector block continuously during the application of an induced voltage between the line and ground which exceeds a predetermined value.

3. The combination of a conductor exposed to inductive interference, a saturating reactor one terminal of which is grounded, a protector block connected between the ungrounded terminal of the reactor and said conductor, a two-electrode gas filled tube, a relay having its winding connected in a permanently closed circuit between the ungrounded terminal of the reactor through the gas filled tube and the conductor, and means responsive to the application of a predetermined voltage across the gas filled tube for operating said relay and completely shorting the circuit between the conductor and the ungrounded terminal of the reactor.

4. The combination of a conductor exposed to inductive interference, two protective devices permanently connected operatively in parallel relationship between said conductor and ground, both devices having different predetermined break-down voltages, and means responsive to the application of a voltage exceeding the break-down value of the device of lower break-down voltage for completely shunting both devices out of the circuit only during the interval of time through which said voltage remains applied.

5. The combination of a conductor, a protector block, a reactor connected in series with the protector block between the conductor and ground, a two-electrode gas filled tube, a condenser and a relay the winding of which is connected in series with said condenser and said gas filled tube in a circuit which shunts the protector block, and means responsive to the application of a voltage exceeding a predetermined value between the conductor and ground for providing a path of negligible impedance around the protector block; said path comprising the circuit in shunt with said protector block.

6. The combination of a plurality of conductors which are exposed to inductive interference, a saturating reactor, a plurality of protector blocks one associated with each of said conductors, the various conductors being connected to ground through the corresponding protector blocks and the saturating reactor, a two-electrode gas discharge device, a condenser, an alternating current relay the winding of which is connected in series with said condenser and said discharge device in a circuit which shunts one of said protector blocks, and means responsive to the operation of the alternating current relay for completely shunting all of the protector blocks and for by-passing the inductive effects impressed upon the various conductors through the saturating reactor.

7. The combination of an exposed telephone line, a protector block connected between said line and ground, and a circuit permanently and operatively shunting said protector block which includes a two-electrode gas discharge tube having a lower break-down voltage than that of the protector block.

8. In combination with a telephone line exposed to inductive interference, a circuit including a protector block connected between said line and ground, a two-electrode gas discharge device permanently connected operatively in shunt with the protector block and having a break-down voltage which is lower than that of the protector block, and means responsive to a gaseous discharge through the gas filled tube for providing a circuit of low resistance across the protector block.

9. The combination of a line exposed to extraneous voltages, a first protection circuit interposed between the said line and ground, a second protection circuit in parallel with the first protection circuit, the second protection circuit including two oppositely poled rectifiers, and means responsive to the flow of current through either rectifier to provide a complete shunting path for the first protection circuit.

10. The combination of a telephone line, a first protection circuit interposed between said line and ground, a second protection circuit in shunt with the first protection circuit, the second protection circuit including two oppositely poled rectifiers and a relay having two windings which are connected in series with the respective rectifiers, and means responsive to the operation of said relay for providing a complete shunt around the first protection circuit.

11. The combination of a line, two parallel circuits of high impedance connected between said line and ground, said parallel circuits respectively including oppositely poled rectifiers, and means responsive to the flow of current through either rectifier to effectively ground said line.

12. The combination of a line, a first high impedance protection circuit connected between said line and ground, and a second high impedance protection circuit permanently connected operatively in parallel with the first protection circuit, the second protection circuit including a plurality of devices having discharge gaps which are connected in series with each other.

13. The combination of a first protection circuit, a second protection circuit in parallel with the first protection circuit, said second circuit including a plurality of two-electrode gas filled tubes connected in series relationship, and a plurality of elements of high impedance, each of said elements shunting one of said gas filled tubes.

14. A protection circuit for a telephone line comprising a plurality of two-electrode gas filled tubes which are connected in series with each other between said line and ground, and means for rendering the break-down voltage of said gas filled tubes substantially equal to the sum of the break-down voltages of the individual tubes, said means comprising a plurality of elements of high impedance, each of said elements shunting one of said tubes.

LELAND KASSON SWART.